(12) United States Patent
Mitic

(10) Patent No.: US 10,629,204 B2
(45) Date of Patent: Apr. 21, 2020

(54) ACTIVATION TRIGGER PROCESSING

(71) Applicant: Spotify AB, Stockholm (SE)

(72) Inventor: Richard Mitic, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 16/150,459

(22) Filed: Oct. 3, 2018

(65) Prior Publication Data

US 2019/0325869 A1 Oct. 24, 2019

(30) Foreign Application Priority Data

Apr. 23, 2018 (EP) .................................. 18168702

(51) Int. Cl.
*G10L 15/00* (2013.01)
*G10L 15/22* (2006.01)
*G10L 15/08* (2006.01)
*G10L 15/30* (2013.01)

(52) U.S. Cl.
CPC .............. *G10L 15/22* (2013.01); *G10L 15/08* (2013.01); *G10L 15/30* (2013.01); *G10L 2015/088* (2013.01); *G10L 2015/223* (2013.01)

(58) Field of Classification Search
CPC .................................................... G10L 15/00
USPC ... 704/235, 9, 268, 260, 254, 251, 236, 500; 705/14.17, 39; 715/221
See application file for complete search history.

(56) References Cited

U.S. PATENT DOCUMENTS

| | | | |
|---|---|---|---|
| 5,455,889 A * | 10/1995 | Bahl ..................... | G10L 15/142 704/236 |
| 6,961,704 B1 * | 11/2005 | Phillips ................... | G10L 13/10 704/267 |
| 7,778,816 B2 * | 8/2010 | Reynar ................. | G06F 17/243 704/1 |
| 8,244,534 B2 * | 8/2012 | Qian ....................... | G10L 13/06 704/243 |
| 9,098,467 B1 | 8/2015 | Blanksteen et al. | |
| 9,275,637 B1 | 3/2016 | Salvador et al. | |
| 9,368,105 B1 | 6/2016 | Freed et al. | |
| 9,418,656 B2 | 8/2016 | Foerster et al. | |
| 9,514,747 B1 | 12/2016 | Bisani et al. | |
| 9,704,486 B2 | 7/2017 | Basye et al. | |
| 9,728,188 B1 | 8/2017 | Rosen et al. | |
| 9,749,741 B1 | 8/2017 | Yang et al. | |
| 9,812,128 B2 | 11/2017 | Mixter et al. | |

(Continued)

FOREIGN PATENT DOCUMENTS

| EP | 3067884 A1 | 9/2016 |
|---|---|---|
| EP | 3179475 A1 | 6/2017 |

OTHER PUBLICATIONS

U.S. Appl. No. 16/150,480 as filed, titled "Activation Trigger Processing", filed Oct. 3, 2018.

(Continued)

*Primary Examiner* — Michael Colucci
(74) *Attorney, Agent, or Firm* — Merchant & Gould P.C.

(57) ABSTRACT

Utterance-based user interfaces can include activation trigger processing techniques for detecting activation triggers and causing execution of certain commands associated with particular command pattern activation triggers without waiting for output from a separate speech processing engine. The activation trigger processing techniques can also detect speech analysis patterns and selectively activate a speech processing engine.

12 Claims, 10 Drawing Sheets

(56) References Cited

U.S. PATENT DOCUMENTS

| | | | |
|---|---|---|---|
| 9,854,439 B2 | 12/2017 | Raniere | |
| 2004/0078191 A1* | 4/2004 | Tian | G06F 17/275 |
| | | | 704/9 |
| 2004/0128137 A1 | 7/2004 | Bush et al. | |
| 2004/0158464 A1* | 8/2004 | Baker | G10L 15/083 |
| | | | 704/231 |
| 2004/0236570 A1* | 11/2004 | Tato | G10L 15/02 |
| | | | 704/206 |
| 2005/0171766 A1* | 8/2005 | Albesano | G10L 15/16 |
| | | | 704/202 |
| 2008/0288256 A1* | 11/2008 | Agapi | G10L 13/04 |
| | | | 704/260 |
| 2011/0246181 A1* | 10/2011 | Liang | G06F 17/2775 |
| | | | 704/9 |
| 2014/0222436 A1 | 8/2014 | Binder et al. | |
| 2015/0032443 A1* | 1/2015 | Karov | G06F 17/2785 |
| | | | 704/9 |
| 2015/0248885 A1* | 9/2015 | Koulomzin | G10L 15/08 |
| | | | 704/251 |
| 2015/0302855 A1 | 10/2015 | Kim et al. | |
| 2015/0340040 A1 | 11/2015 | Mun et al. | |
| 2016/0012465 A1* | 1/2016 | Sharp | G06Q 20/18 |
| | | | 705/14.17 |
| 2016/0104480 A1* | 4/2016 | Sharifi | G10L 17/22 |
| | | | 704/254 |
| 2018/0012593 A1 | 1/2018 | Prasad et al. | |
| 2018/0061419 A1* | 3/2018 | Melendo Casado | G10L 15/22 |
| 2018/0182390 A1* | 6/2018 | Hughes | G10L 15/02 |
| 2018/0196776 A1* | 7/2018 | Hershko | G06F 13/4291 |
| 2019/0259382 A1 | 8/2019 | Stogner et al. | |

OTHER PUBLICATIONS

Extended European Search Report and Written Opinion from European Application No. 18168702.1, dated Jul. 3, 2018.

Veton Kepuska: "Wake-Up-Word Speech Recognition", Speech Technologies, Jun. 2011. Available Online at: https://www.intechopen.com/books/speech-technologies/wake-up-word-speech-recognition#B19.

* cited by examiner

FIG. 9

Activation Trigger Data Structure

| Pattern | Command |
|---|---|
| "hey computer" | SpeechProcessingEngine.activate() // Activate SP engine |
| "ahoy computer" | SpeechProcessingEngine.activate() // Activate SP engine |
| "ahoy computer pause" | Player.pause() //Execute pause command |
| "computer pause" | Player.pause() //Execute pause command |
| "computer play next" | Player.next() //Execute play next command |
| "computer next" | Player.next() //Execute play next command |
| ... | ... |
| "computer preset one" | Player.play(presetOne) //Execute play preset one command |

ACTIVATION TRIGGER PROCESSING

CROSS-REFERENCE TO RELATED APPLICATIONS

This application claims priority to European Patent Application No. 18168702.1, titled ACTIVATION TRIGGER PROCESSING, filed Apr. 23, 2018, and which is incorporated by reference herein in its entirety. Further, this application is related to U.S. application Ser. No. 16/150,480, titled ACTIVATION TRIGGER PROCESSING, filed Oct. 3, 2018.

TECHNICAL FIELD

The present disclosure relates to technical solutions for utterance-based user interfaces.

BACKGROUND

Voice interfaces determine whether audio input includes a speech command, and how to behave in response. For instance, a person may use a voice interface of a virtual assistant on a smart phone to find out the weather by verbally asking: "What's the weather like today?" The virtual assistant receives and analyzes this question, and returns an answer. This process is resource intensive, so such processing is sometimes performed at a server that is remote from the device that initially received the utterance. Although offloading the processing to a server conserves computing resources at the device level, undesirable delay is also added. In addition, relying on a server for the processing causes issues when the server is unreachable, such as when a mobile device loses a network connection.

Wake word detection modules are sometimes implemented as a gate in front of additional processing components and are used to prevent audio input from being provided to an automatic speech recognizer that generates speech recognition results.

US 2018/0012593 describes a detection model used to determine whether a wake word has been uttered. The detection model uses features derived from an audio signal and contextual information to generate a detection score. If the detection score exceeds a threshold, automatic speech recognition and natural language understanding modules are activated so that the speech processing system can generate speech recognition results.

U.S. Pat. No. 9,098,467 describes a voice-controlled device that operates in at least two states. In a first state, a microphone captures sound, and the sound is processed by an automatic speech recognition component. The results of automatic speech recognition are, in turn, compared to a wake word. If a wake word is detected, the device transitions into a second state in which the device provides audio signals to a network-based computing platform that identifies commands from the speech indicated by the audio signals using automatic speech recognition.

SUMMARY

The present disclosure provides methods, apparatuses, and computer-readable products for activation trigger processing in utterance-based user interfaces.

In some embodiments, a system is provided that includes one or more processors configured to operate as a speech analysis engine and an activation trigger engine. The activation trigger engine is configured to detect an activation trigger within an audio input, selectively activate the speech analysis engine based on the activation trigger matching a first pattern, and, responsive to the activation trigger matching a second pattern, cause execution of a command associated with the second pattern without requiring an output from the speech analysis engine.

In an example, the speech analysis engine is configured to perform speech-to-text conversion; and the activation trigger engine is configured to detect the activation trigger within the audio input without using speech-to-text conversion. A first device can have a first set of one or more processors configured to operate as the speech analysis engine, and a second device that is remote from the first device can have a second set of one or more processors configured to operate as the activation trigger engine. The second pattern can include the first pattern. The activation trigger engine can be further configured to, responsive to the activation trigger matching the second pattern, deactivate the speech analysis engine. The activation trigger engine can be further configured to cause an output from the speech analysis engine to be disregarded, responsive to the activation trigger matching the second pattern. The first activation trigger pattern can include a first set of N components, where N is an integer greater than one. The second activation trigger pattern includes a second set of components, where the second set includes one or more command components associated with a command, and M components from the first set, where M is an integer greater than zero and less than N.

In another embodiment, there is a computer-readable medium comprising one or more sequences of instructions that, when executed by one or more processors, cause the one or more processors to perform a method. The method includes: obtaining audio input; determining whether the audio input includes a speech analysis pattern; responsive to the audio input including a speech analysis pattern, activating a speech analysis engine for identification of a command; determining whether the audio input includes a command pattern; and, responsive to determining that the audio input includes the command pattern, executing a command associated with the command pattern.

In an example, the method further includes establishing a connection with a remote server having the speech analysis engine. The command pattern can include the speech analysis pattern. The method can further include determining that the audio input includes the command pattern and the speech analysis pattern. The method can further include disregarding a response from the speech analysis engine received after executing the command. The method can further include, responsive to determining that the audio input matches the command pattern, deactivating the speech analysis engine. The speech analysis pattern can include a first set of N components, where N is an integer greater than one, and the command pattern includes a second set of components, wherein the second set includes one or more command components associated with a command, and M components from the first set, where M is an integer greater than zero and less than N. The method can further include selecting the command associated with the speech analysis pattern from a plurality of commands. The method can further include providing at least a portion of the audio input to a speech processing engine for identification of the command within the audio input.

BRIEF DESCRIPTION OF THE DRAWINGS

The features and advantages of the present disclosure will become more apparent from the detailed description set forth below when taken in conjunction with the following drawings.

FIG. 9 illustrates an example implementation of an activation trigger data store.

DETAILED DESCRIPTION

The example embodiments presented herein are directed to systems, methods, and non-transitory computer-readable medium products for activation trigger processing in utterance-based user interfaces. This is for convenience only, and is not intended to limit the application of the present invention. After reading the following description, it will be apparent to one skilled in the relevant art how to implement the following disclosure in alternative embodiments.

Figure 1:
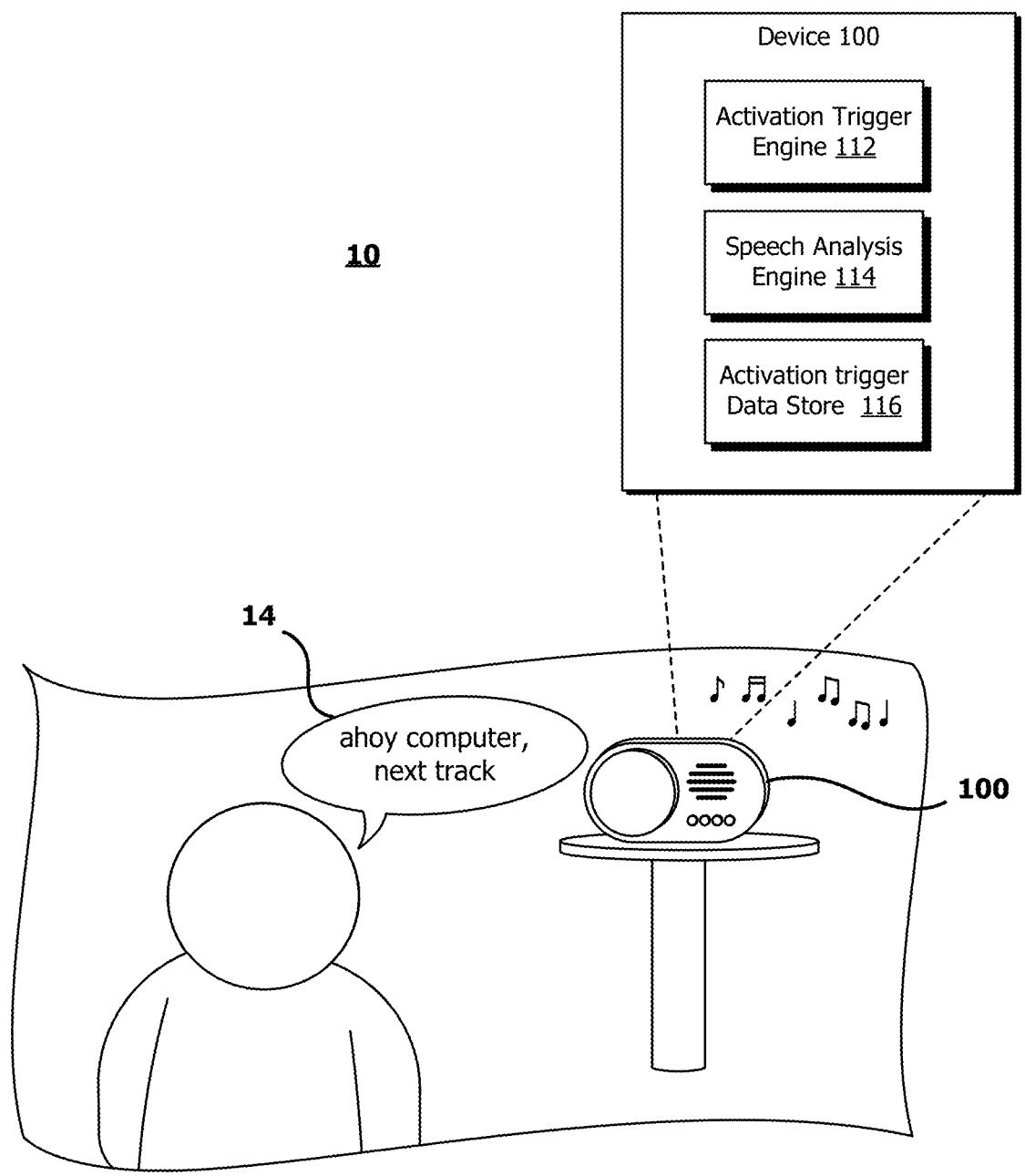
FIG. 1 illustrates an example system for providing an utterance-based user interface at a device.

System for Providing an Utterance-Based User Interface Having an Activation Trigger Engine FIG. 1 illustrates an example system 10 for providing an utterance-based user interface at a device 100. In the illustrated example, the device 100 is a smart audio appliance for playing media content items that is controlled using an utterance-based user interface. For example, responsive to a user asking the device 100 to play a particular song, the device 100 can play the requested song (or take another action).

Voice input to the utterance-based user interface is referred to as an utterance 14. In the example system 10, the user directs the utterance 14, "ahoy computer, next track", at the device 100. The device 100 listens to ambient sounds using a microphone or another audio input source. In turn, device 100 processes the ambient sounds, to detect and further process utterances 14. The device 100 then performs an action in response to the utterance. For example, responsive to the phrase "[play the] next track", the device 100 plays the next track in a media playback context.

In the illustrated example, the device 100 includes an activation trigger engine 112, a speech analysis engine 114, and an activation trigger data store 116, among other components. The device 100 uses the activation trigger engine 112, a speech analysis engine 114, and an activation trigger data store 116, (among others) to analyze the characteristics or features of the utterance 14 (and other received sounds) and to provide an utterance-based user interface.

In an example, the system 10 includes one or more processors that operate as the speech analysis engine 114 and the activation trigger engine 112. In an example, the speech analysis engine 114 is configured to perform speech-to-text conversion, and the activation trigger engine 112 is configured to detect an activation trigger within audio input without using speech-to-text conversion. In the illustrated example, the one or more processors operating as the speech analysis engine 114 and the activation trigger engine 112 are located at the device 100. In other examples, the one or more processors include a first set of one or more processors configured to operate as the speech analysis engine 114 and a second set of one or more processors configured to operate as the activation trigger engine 112. In such examples, the system includes a first device having the first set of one or more processors configured to operate as the speech analysis engine 114 and a second device remote from the first device and having the second set of one or more processors configured to operate as the activation trigger engine 112.

The activation trigger engine 112 detects activation triggers within utterances 14, and activates one or more processes in response thereto. The activation trigger engine 112 can take a variety of forms. In an example, the activation trigger engine 112 includes a machine learning model trained to recognize sounds (e.g., the pattern of sounds in audio that includes a spoken activation trigger), and the activation trigger engine 112 provides an output based on recognized sound. In another example, the activation trigger engine 112 includes an offline speech-to-text engine with a small vocabulary (e.g., a vocabulary limited to activation triggers), and the activation trigger engine 112 provides an output based on the resulting text. An activation trigger is a predetermined utterance (e.g., a word or phrase) spoken by the user to indicate an intent to activate a voice-based user interface. In the illustrated example (and in many other examples herein), the phrase "ahoy computer" is used as an activation trigger. Responsive to detecting the activation trigger, the activation trigger engine 112 provides at least a portion of the utterance 14 to the speech analysis engine 114 for natural language processing or other analysis.

In this manner, one or more activation triggers are usable to activate one or more capabilities of the device 100. In many instances, an activation trigger is a particular word or phrase. In some instances, the device is configured to receive activation triggers in the form of an electronic signal, such as a signal from a user actuating a user input mechanism (e.g., a button). In other examples, activation triggers are received in the form of a signal received from another device. In still other examples, the device 100 is configured to detect activation triggers received outside of the threshold of human hearing.

Activation triggers serve several purposes, and facilitate overcoming technical challenges in utterance-based user interfaces. In general, utterance-based user interfaces operate by listening to an ambient environment and appropriately responding to speech that the interface understands. Typically, they receive all utterances in their vicinity, including those not specifically directed to the user interface. This presents challenges relating to resource usage and user privacy, such as privacy concerns relating to recording of conversations not directed to the device 100.

Speech analysis (e.g., speech-to-text and natural language processing) in voice-based user interfaces is a relatively resource intensive process, including computing resources such as processor cycles, memory resources, power, network resources, combinations thereof, or other resources. Performing speech analysis on audio not intended to be processed (e.g., speech not directed to the device) is wasteful of computing resources and can lead to the degradation of the electronic components of a device. In addition, activation triggers protect user privacy. Many users are wary of a device that is always listening. Limiting speech analysis to situations in which the device is activated addresses user concerns relating to privacy. Activation triggers also reduce the risk of a voice-based user interface responding when it is not being addressed. These features illustrate some of the benefits that can be provided by a speech analysis engine operating in a default, inactive mode and then transitioning to an active mode responsive to an activation trigger engine determining that an utterance includes an activation trigger.

The speech analysis engine 114 is used by the device to process the utterance 14, to understand the utterance 14, and to generate an appropriate response. In an example, the processing involves speech-to-text processing on the utterance 14 and performing natural language processing on the resulting text. The speech analysis engine 114 outputs an intent based on the analysis of the natural language processing. The intent is usable by the speech analysis engine 114 to determine and perform an associated action. Because speech-to-text processing, natural language processing, and other utterance processing are relatively resource intensive, the speech analysis engine 114 usually cooperates with a remote speech analysis engine on a server (not shown). In an example, the speech analysis engine 114 sends the utterance 14, or portions or representations thereof (e.g., a numeric value that uniquely identifies the utterance or portion of the utterance, such as a hash value), to the server for processing. While remote processing conserves resources and provides other benefits, communicating the utterance data for the remote processing introduces a response delay as well as issues related to network connectivity.

One technique for improving utterance-based user interfaces described herein involves using an activation trigger engine 112 to execute particular commands based on detecting particular activation triggers. These activation triggers are referred to herein as command-type activation triggers. Command-type activation triggers are activation triggers that are associated with a command. For example, responsive to the device 100 detecting a command-type activation trigger, the device executes a command associated with the command-type activation trigger with relatively little to no additional processing by the speech analysis engine 114 required to identify the command. In an example, the speech analysis engine 114 performs no additional processing to identify the command, and the speech analysis engine 114 remains in an inactive state, thereby conserving resources. Such activation triggers are suitable for short, commonly used commands, such as pausing playback, resuming playback, and skipping tracks, among others.

Command-type activation triggers can stand in contrast to activation triggers configured to cause activation of the speech analysis engine 114 for further processing. Such activation triggers configured to cause activation of the speech analysis engine for further processing can be referred to as analysis-type activation triggers. One technique for improving utterance-based user interfaces described herein involves overloading the activation trigger engine 112 to handle command-type activation triggers in addition to analysis-type activation triggers. In this manner, a device that receives an activation trigger can perform different actions depending on whether the activation is a command-type activation trigger or an analysis-type activation trigger.

In an example, in addition to detecting an analysis-type activation trigger that activates the speech analysis engine 114, the activation trigger engine 112 is further configured to detect and respond to command-type activation triggers that cause the activation trigger engine to execute a particular command when detected without needing further processing. For instance, an activation trigger engine 112 configured to recognize the entire utterance "ahoy computer play next" as a command-type activation trigger, responds to that phrase by executing a play-next command without needing the speech analysis engine 114 (or a remote server) to perform natural language processing. Advantageously, when these command-type activation triggers are used, the responsiveness of the utterance-based user interface is improved by allowing for efficient processing of utterances by the activation trigger engine 112 without needing to wait for a response from a remote server or consuming significant computing resources via the speech analysis engine 114. By determining a command based on the utterance at the device 100, the utterance data remains on the device. In addition, the utterance is processed locally on the device. As such, the utterance is not communicated to the remote speech analysis engine 114. By reducing the number of utterances sent to a remote speech analysis engine 114, the potential attack surface on user data is reduced and user privacy becomes easier to protect.

In an additional example, an activation trigger engine 112 includes a machine learning framework trained to recognize the entire utterance "ahoy computer play my favorite song" as a command-type activation trigger that causes execution of a play command with the parameter "my favorite song". In this example the utterance "ahoy computer play my favorite song" is a command-type activation trigger. In another example, there is an activation trigger engine 112 trained to recognize the phrase "ahoy computer" as an analysis-type activation trigger. In such an example, when presented with the utterance "ahoy computer play my favorite song" the activation trigger engine 112 recognizes "ahoy computer" in the utterance as an analysis-type activation trigger and provides at least a portion of the utterance to the speech analysis engine 114 for further processing to determine the intent of the utterance.

As an additional advantage, command-type activation triggers allow for construction of shorter utterances. In an example, a play-next-track utterance is formed using an analysis-type activation trigger (e.g., "ahoy computer") and a command utterance (e.g., "play next"), which results in the phrase: "ahoy computer, play next" (four words and seven syllables). A command-type activation trigger is formable from relatively fewer components, such as "computer play next", which has three words and five syllables. Long activation triggers are often desirable to avoid false positives. Command-type activation triggers are already lengthened because they include an indication of a command, so they need not necessarily be as long as concatenating an analysis-type activation trigger (e.g., "ahoy computer") with a command (e.g., "play next"). Increasing activation trigger length can also increase computational complexity. In many examples, an activation trigger having 3-5 syllables strikes a preferred balance between computational complexity (e.g., which can result in increased command-to-action time) and reduction of false positives. For instance, both "computer play next" and "computer next" can be preferable command-type activation triggers. The former is less prone to false positives and the latter decreases the command-to-action time. But preferred length varies depending on the circumstances in which the utterance-based user interface will be used and user preferences. Where the device 100 has a limited number of possible actions, shorter activation triggers can be constructed by omitting context words or phrases. For example, "computer play next track" can be shortened to "computer next" by omitting unnecessary context provided by "play" and "track" for devices with functionality focused on playing music. In certain use cases, it can preferable to form command-type activation triggers from short commands, such as: next, stop, previous, pause, and play.

An additional consideration when constructing an activation trigger is whether the activation trigger is commonly used in background noise or conversation that is not directed to the device 100. For example, "hi" is a convenient activation trigger, but is vulnerable to false positives due to the word being frequently used in contexts other than addressing the device 100. Further, there may be many noises with sound patterns similar to the sound of someone saying "hi", which can cause further false positives.

Utterance-Based User Interface

Products that provide an utterance-based user interface are configured to take action in response to utterances.

Figure 2:
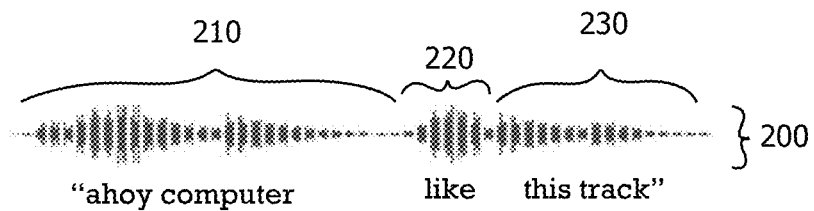
FIG. 2 illustrates an example utterance having activation trigger, command, and parameter portions.

FIG. 2 illustrates an example utterance 200. This utterance 200 includes a speech-analysis activation trigger portion 210, a command portion 220, and a parameter portion 230. In the illustrated example, the speech-analysis activation trigger 210 of the utterance 200 corresponds the phrase "ahoy computer", the command portion 220 corresponds to the phrase "like", and the parameter portion 230 corresponds the phrase "this track".

The device 100 receives the utterance 200. Responsive to the activation trigger engine 112 detecting the speech-analysis activation trigger 210, the activation trigger engine 112 provides at least a portion of the utterance 200 to the speech analysis engine 114 or otherwise activates the speech analysis engine 114. The speech analysis engine 114 processes some or all of the utterance 200 and identifies one or more of the various portions 210, 220, 230. Identifying the portions is performed using a variety of techniques. According to one technique, the utterance 200 is segmented into constituent portions based on the text content of the utterance 200. According another technique, the utterance 200 is segmented based on how the utterance 200 was uttered (e.g., splitting the utterance based on pauses, phonemes, syllables, or other aspects of the utterance), among other techniques. Where the speech analysis engine 114 determines that the utterance 200 includes the command portion 220, the speech analysis engine 114 determines a command associated with the command portion 220 (e.g., using natural language processing, look-up tables, or other techniques).

The speech analysis engine 114 also determines whether the utterance 200 includes a parameter portion 230. The determined command is then executed using the one or more parameters in the parameter portion 230. Based on the output of the executed command, the device 100 generates a response or confirmation for the user. The output varies depending on specifics of the command and how it is executed. In some instances, the output is an effect. For instance, execution of a next-track command can have the effect of causing playback to advance to the next song in a currently-playing context. In some instances, the output is an indication as to whether the command executed properly. In an example, responsive to the next-track command executing successfully, the output can further be the Boolean value true. Responsive to the next-tract command failing (e.g., due to a connectivity loss preventing the device from contacting a server to retrieve the next track to be played), the output can be the Boolean value of false or a thrown exception.

Utterances usable by a voice-based user interface need not include all three of these portions. For instance, a user may speak an analysis-type activation trigger (e.g., "ahoy computer"), wait for the device 100 to provide a confirmation that it is listening, and then provide a command as part of a separate utterance (e.g., "what song were you just playing?"). In another example, a user may speak the utterance "hey computer, preset one", which includes an analysis-type activation trigger ("hey computer") and a parameter portion ("preset one"), but not a command portion. In an example, the device 100 is configured to infer the presence of a command based on the parameters or a context in which the utterance was provided (e.g., using natural language processing).

Figure 3:
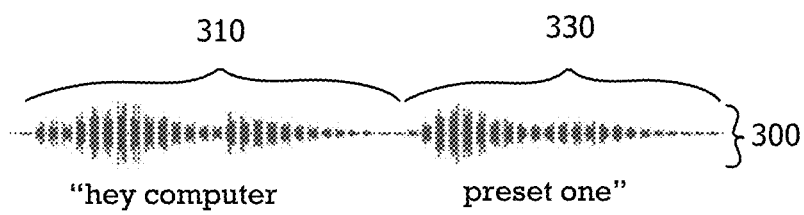
FIG. 3 illustrates an utterance having activation trigger and parameter portions.

FIG. 3 illustrates an utterance 300 having an analysis-type activation trigger 310 and a parameter portion 330, and having an inferred command portion. The utterance 300 includes the phrase "hey computer preset one", with the analysis-type activation trigger 310 including "hey computer" and the parameter portion 330 including "preset one".

Figure 4:
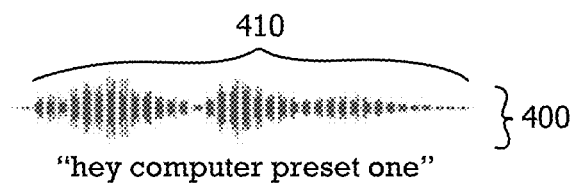
FIG. 4 illustrates an example utterance that may be processed as having an activation trigger portion.

Examples of utterance-based user interfaces include interfaces configured to process an entire utterance as an activation trigger portion, even if such an utterance would normally be processed as an utterance having multiple portions. For example, as will be described in relation to FIG. 4, a device will process the utterance "hey computer preset one" differently depending on how the device is configured. In FIG. 3, "hey computer preset one" is processed as having an analysis-type activation trigger 310 and a parameter portion 330. In FIG. 4, the entire phrase "hey computer preset one" is processed as containing a command-type activation trigger.

FIG. 4 illustrates an example utterance 400 determined by the device 100 as having a command-type activation trigger portion 410. The utterance 400 is the same as the utterance 300: "hey computer preset one". But rather than being determined to have separate activation trigger and parameter portions, the activation trigger engine 112 processes the entire utterance 400 as a command-type activation trigger portion 410. In this manner, the activation trigger engine 112 causes the device 100 to respond in a particular manner (e.g., switching to preset one) without waiting for the utterance 400 to undergo additional processing (e.g., at a server or local to the device 100).

Whether an utterance is processed as having a command-type activation trigger or an analysis-type activation trigger is largely defined by the capabilities of the device itself. A device without activation trigger overloading processes each activation trigger as being an analysis-type activation trigger. A device with activation trigger overloading for certain utterances processes those certain utterances as command-type activation triggers. In some examples, an utterance is processed by a device as having both command-type and analysis-type activation triggers. An example method for processing such situations is described in relation to FIG. 11.

Constructing Command Activation Triggers

A command-type activation trigger can be constructed in different ways. In some examples, the command-type activation trigger is constructed from the combination of an analysis-type activation trigger (e.g., "ahoy computer") and a command (e.g., "play next track") to form a command-type activation trigger "ahoy computer play next track". A user is likely accustomed to using the general pattern of "[analysis-type activation trigger]+[command]" when attempting to interact with the device 100 using an utterance-based user interface. For this reason, in many examples it is advantageous to use utterances of the form [analysis-type activation trigger]+[command] to create a command-type activation trigger pattern recognizable by the activation trigger engine 112 to execute an associated command.

The usage of a command-type activation trigger provides further advantages beyond improved processing time. Increased activation trigger length reduces the risk of accidental triggering of the utterance-based user interface. Having the activation trigger engine 112 configured to recognize command patterns constructed as the combination of an activation trigger and a command reduces false positives by requiring matching of a longer pattern (e.g., activation trigger+command) compared to the activation trigger alone.

In some examples, a command-type activation trigger is constructed from a shortened analysis-type activation trigger (e.g., "computer" rather than "ahoy computer"). This shortening provides several advantages. First, shortening improves the ability of the user to interact with the user interface by shortening the utterance length required to achieve a desired result. Second, shortening reduces the number of false activations of the speech analysis engine.

As an example of how shortening the command-type activation trigger can reduce false activations, consider a device configured to process the utterance "ahoy computer" as an analysis-type activation trigger and the phrase "ahoy computer pause" as a command-type activation trigger that causes execution of a pause playback command. When processing the utterance "ahoy computer pause", the device will trigger off of both the command-type activation trigger and the analysis-type activation trigger. This is because, by the time the first part of the utterance ("Ahoy computer . . . ") is received by the device 100, the activation trigger engine 112 likely detected that activation trigger and activated the speech analysis engine 114; but when the remainder of the phrase is received by the device, the activation trigger engine 112 detects that the entire command-type activation trigger was uttered and causes execution of the pause command without needing the output of the speech analysis engine. An example process for handling this situation is described in connection with FIG. 11.

Another way of addressing this situation is to avoid it altogether by constructing a command-type activation trigger from a subset of the components of the analysis-type activation trigger, such as by dropping the "computer" from "ahoy computer favorite this track" to make an entire command-type activation trigger: "ahoy, favorite this track". Because command-type activation triggers are already lengthened, as they include a command portion, command-type activation triggers can be shortened without a substantial increase in false positives (e.g., the activation trigger detector classifying an utterance as having an activation trigger when the utterance does not include an activation trigger). Examples of a process for constructing a command-type activation trigger are described in relation to FIGS. 5 and 6.

Figure 5:
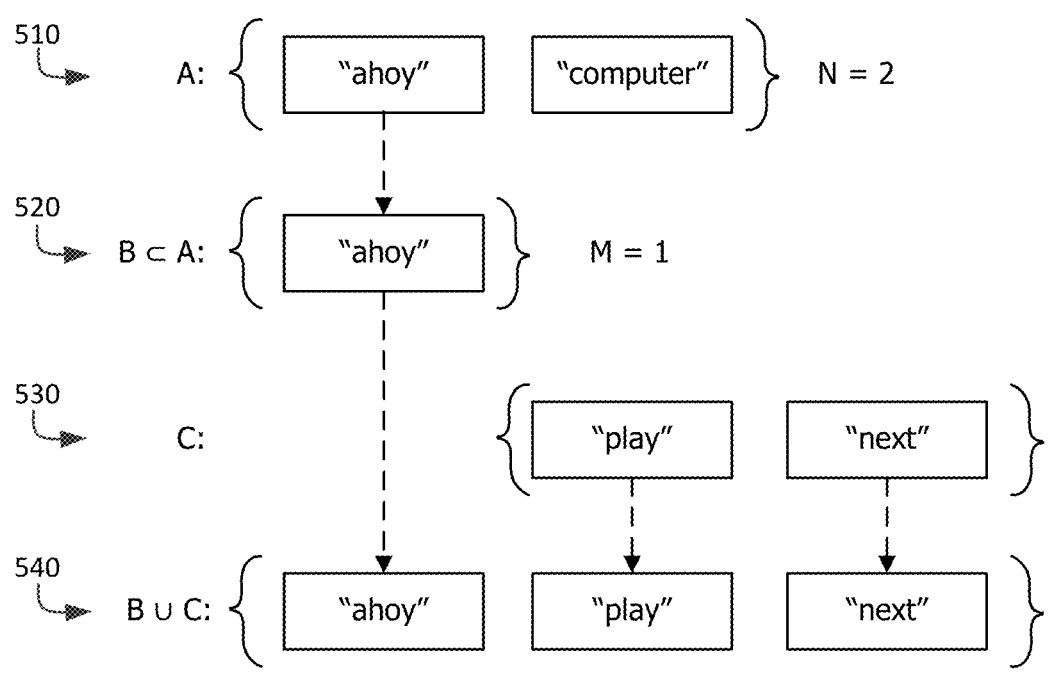
FIG. 5 illustrates forming a command pattern set using words from a speech analysis set, a speech analysis subset, and a command component set.

FIG. 5 illustrates using an analysis-type activation trigger set 510, a speech analysis subset 520, and a command component set 530 to make a command-type activation trigger set 540 based on words. In an example, a first activation trigger pattern includes a first set of N components (where N is an integer greater than one); and a second activation trigger pattern includes a second set of components that includes one or more command components associated with a command and M components from the first set (where M is an integer greater than zero and less than N).

The analysis-type activation trigger set 510 refers to a set of utterance components associated with triggering speech analysis. The activation trigger engine 112 can be configured to operate in one of several modes. The analysis-type activation trigger set 510 can take a variety of different forms depending on how the activation trigger engine 112 is configured. In this example, the analysis-type activation trigger set 510 includes words that make up an analysis-type activation trigger. In the illustrated example, the analysis-type activation trigger set 510 includes two words: "ahoy" and "computer", so the size (N) of the analysis-type activation trigger set 510 is two. In many examples, the analysis-type activation trigger set 510 forms the basis of many different command patterns.

The speech analysis subset 520 is a proper subset of the analysis-type activation trigger set 510. In the illustrated example, the speech analysis subset 520 includes the word "ahoy", so the size (M) of the speech analysis subset 520 is one.

The command component set 530 is a set of utterance components that the device 100 associates with a command. In an example, the device 100 is configured to execute a specific command in response to detecting an utterance containing the components of the command component set 530. In the illustrated example, the command component set 530 includes the words: "play" and "next", and the command component set 530 is associated with a command to play the next media content item in a current playback context (e.g., playlist, television season, album).

The command-type activation trigger set 540 is also set of utterance components that the device 100 associates with a command. In an example, the device 100 is configured to detect the command-type activation trigger set 540 using the activation trigger engine 112, whereas the device 100 is configured to detect the command component set 530 using the speech analysis engine 114. In the illustrated example, the command-type activation trigger set 540 is formed from the union of the speech analysis subset 520 and the command component set 530, though it is formable in other ways.

Figure 6:
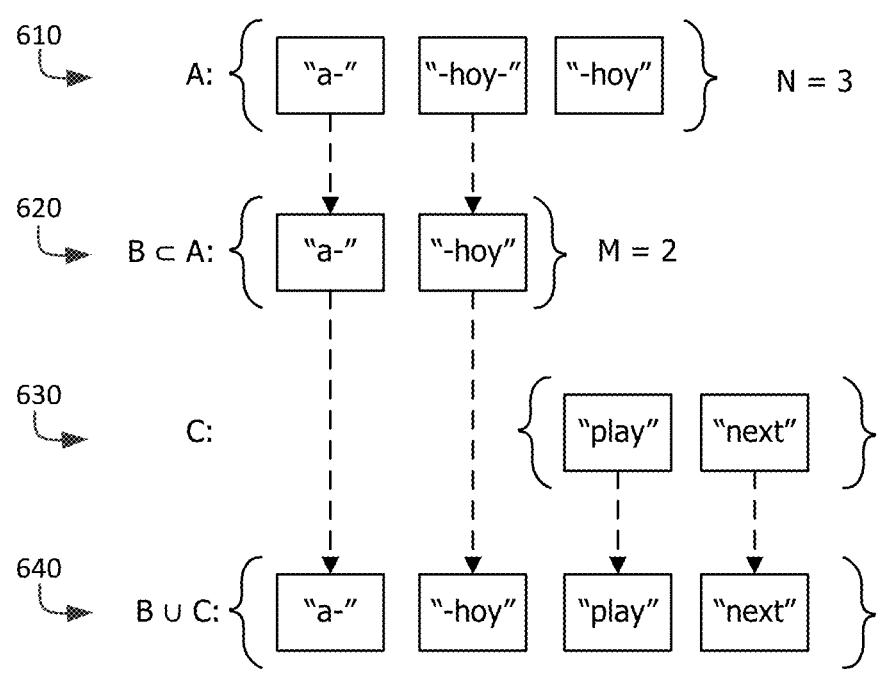
FIG. 6 illustrates forming a command pattern set from syllables from a speech analysis set, a speech analysis subset, and a command component set.

FIG. 6 illustrates using an analysis-type activation trigger set 610, a speech analysis subset 620, and a command component set 630 that make a command-type activation trigger set 640 based on syllables. In the illustrated example, the analysis-type activation trigger set 610 includes the component syllables of the analysis-type activation trigger word "ahoyhoy". The speech analysis subset 620 includes a subset of the analysis-type activation trigger set 610. The speech analysis subset 620 drops the last syllable of the trigger word to include the components: "a" and "hoy". The command component set 630 includes the component syllables of the words "play" and "next". The command-type activation trigger set 640 is formed from the union of the speech analysis subset 620 and the command component set 630.

FIG. 5 and FIG. 6 provide some examples of forming command-type activation trigger sets from analysis-type activation trigger sets and command component sets. While words and syllables are provided as examples, other components are usable for defining the speech analysis set, such as phonemes. Command-type activation triggers are formable in a variety of other ways as well, such as from a separate base word other than analysis-type activation triggers. In an example, command-type activation triggers are formed from the pattern: "[phrase 1]+command" (e.g., "ahoy"+"skip this track"), and analysis-type activation triggers are formed from the pattern: "[phrase 2]" (e.g., "hey! listen!").

Activation Trigger Processing

Figure 7:
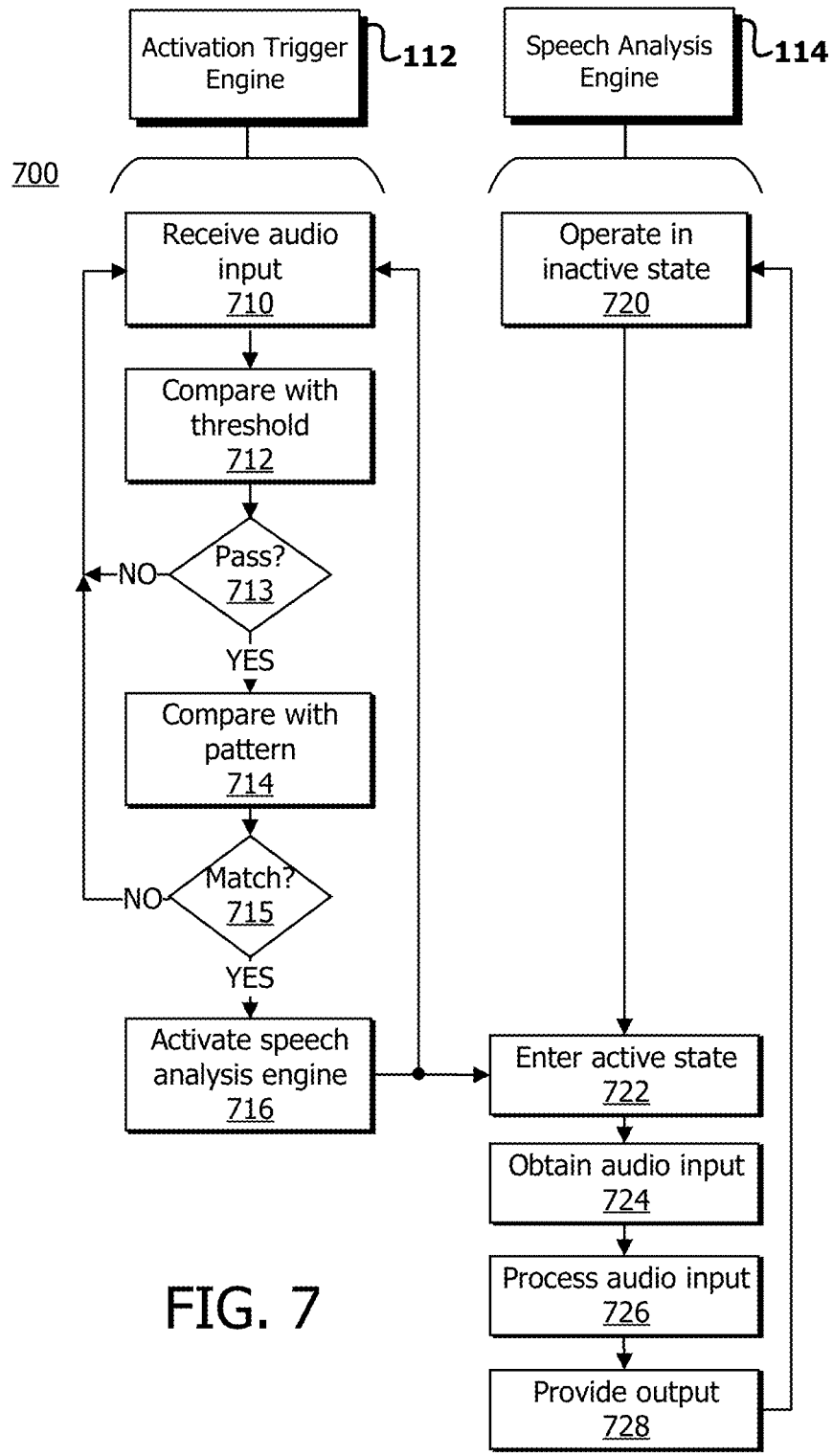
FIG. 7 illustrates an example process for providing an utterance-based user interface.

FIG. 7 illustrates an example process 700 for providing an utterance-based user interface without activation trigger overloading. In this process, the utterance-based user interface processes all activation triggers as being analysis-type activation triggers.

The process 700 begins at operation 710, at which the activation trigger engine 112 receives audio input. In an example, the activation trigger engine 112 receives audio input via a microphone of the device 100 or a connection to an external audio source (e.g., a Bluetooth connection to a device that has a microphone). The device 100 is able to receive the audio input in a variety of ways. In some instances, the audio input is audio input received from a stream (e.g., streaming audio input). In some instances, the audio input includes discrete slices of audio samples or chunked input. As will be understood, various portions of process 700 can occur simultaneously and various buffers or caches are usable to facilitate the comparison of data over time.

In operation 712, the audio input is compared with a threshold. In an example, the volume of the audio input is compared with a threshold decibel value. In another example, the volume of certain frequencies (e.g., frequencies in a range associated with human speech) is compared to a threshold decibel value.

In operation 713, if the audio input satisfies the threshold, then the flow moves to operation 714. Otherwise, the flow returns to operation 710. This threshold testing process is relevant to reducing false positives and conserving computing resources by limiting processing by the activation trigger engine 112 to audio input likely to contain an utterance.

In operation 714, the activation trigger engine 112 compares the audio input with one or more patterns to determine if the audio input includes an activation trigger. The obtained audio input can include utterances that are directed to the device 100, utterances directed to another target (e.g., another person in the room), ambient room noise, or other sounds. A variety of different techniques are usable to determine if the audio input includes an activation trigger.

In one example, features are extracted from the audio input and provided to a machine learning framework configured to determine the likelihood that the extracted features correspond to an activation trigger. Audio data, in general, and human speech data, in particular, contain large amounts of extractable data features. Focusing on features that are particularly relevant to detection of an activation trigger provides advantages. Various techniques are usable for feature extraction. In some examples, mel-frequency cepstrum representations of audio data are used to generate cepstral coefficients features for processing. In other examples, mel-frequency spectral coefficients, log filter banks, spectral analysis, or other techniques are used.

In another example, feature extraction is performed using invertible feature extraction (e.g., using Fourier transforms). For instance, instead of relying on features or parameters only from a time domain of a signal, the signal is transformed into a frequency domain using Fourier transformation. Parameters are then extracted from the frequency domain.

Once extracted, the extracted features are analyzed to determine a similarity with a pattern associated with an activation trigger. This analysis is performable via a variety of techniques including, but not limited to, hidden Markov models, neural networks, and other techniques. In many instances, the activation trigger engine 112 includes one or more pre-trained or pre-generated pattern to compare the features against.

At operation 715, if the received audio input matches the pattern in operation 714, then the flow of the process 700 moves to operation 716. If the received audio input does not match the pattern, then the flow of the process moves back to operation 710. In an example, the audio input matches the pattern if a difference between the features of the audio input and the pattern satisfies a threshold.

At operation 716, the activation trigger engine 112 causes the speech analysis engine 414 to be activated. For instance, previously the speech analysis engine 114 was operating in an inactive state in operation 720. The inactive state can take a variety of different forms. In some instances, the speech analysis engine 114 includes a resource-intensive process for analyzing speech input; and while the speech analysis engine 114 is operating in the inactive state (operation 720), the process is not running. In another example, the speech analysis engine 114 is configured to perform analysis on data within a queue, and the speech analysis engine 114 idles when that queue is empty. In still other examples, the speech analysis engine 114 operates in an inactive state with respect to the activation trigger engine 112. For instance, where the speech analysis engine 114 is located remotely from the activation trigger engine 112 (e.g., at a server), the speech analysis engine 114 can perform operations for devices other than device 100. In other examples, the speech analysis engine 114 does not operate at all when it is in the inactive state (e.g., the speech analysis engine does not exist as a process while "operating" in the inactive state).

Returning to operation 716, the activation trigger engine 112 is able to activate the speech analysis engine 114 in a variety of ways. In an various examples, the activation trigger engine 112 sends a signal to the speech analysis engine 114, the activation trigger engine 112 executes a command, the activation trigger engine 112 accesses an application programming interface associated with the speech analysis engine 114, the activation trigger engine 112 populates a queue with data, or the activation trigger engine 112 pipes the output of a recording device or process to the speech analysis engine 114, among other techniques. Following the completion of this operation 716, the activation trigger engine 112 returns to receiving audio input.

At operation 722, the speech analysis engine 114 enters an active state. This operation 722 takes a variety of different forms, depending on the implementation of speech analysis engine 114. In general, however, entering the active state involves the speech analysis engine 114 analyzing input data or preparing to analyze input data, such as is described in operations 724, 726 and 728.

In operation 724, the speech analysis engine 114 obtains at least some of the audio input data. In some instances, the audio input is "raw" audio data. In other instances, the audio input data includes the features extracted from the audio. In an example, the activation trigger engine 112 buffers the audio input data obtained and, when the audio input data is determined to match an activation trigger pattern, the contents of the buffer (or a pointer to the buffer) are provided to the speech analysis engine 114 for analysis. In such instances, the audio input obtained in operation 724 includes the activation trigger portion (e.g., the analysis-type activation trigger portion 310 as in utterance 302 of FIG. 3) in addition to other portions that the speech analysis engine processes (e.g., the command portion and parameter portion). Once the audio input data is provided to the speech analysis engine 114, or a threshold amount of time passes, the buffer is cleared.

In some instances, the activation trigger engine 112 provides or redirects audio obtained after detection of the activation trigger to the speech analysis engine 114. In such instances, the speech analysis engine 114 obtains audio input data for a portion of an utterance following the activation trigger portion and not the activation trigger portion itself.

The audio input data can be handled according to a defined user privacy policy. In some embodiments, data elsewhere in the system 10 can be handled according to a defined user privacy policy. Generally, data can be used to the extent allowed by the user. In examples, the system 10 provides customizable privacy parameters. For instance, the system 10 maintains one or more privacy parameters directing components of the system 10 as to what data may be stored and how the data is used. One or more parameters are user-customizable, such as through a voice command (e.g., "ahoy computer, don't store what I say" or "ahoy computer, I like my privacy!"). In an example, the system 10 disallows certain features unless allowed by the privacy parameters. In some examples, the storage of data is based on a location of the device 100. For instance, the system 10 receives the location of the device 100 and determines privacy settings based thereon. In addition, data is stored in accordance with applicable regulations. Data can also be stored and used in association with a defined security policy. For example, data can be encrypted at rest and in motion. For instance, audio input data is encrypted during transmission and encrypted while stored. In an example, transmission channels (e.g., for the audio input data) are authenticated in a manner other than using user credentials, such as using data regarding the device 100 itself.

After receiving at least a portion of the audio input, the speech analysis engine 114 can perform operation 726, which involves processing the audio input data. Processing audio input data can take a variety of different forms. In many examples, processing audio input involves performing speech-to-text transcription of the audio input. In other examples, processing audio input can involve determining an intent associated with the utterance. For instance, if the speech analysis engine 114 were processing the utterance 300 as audio input, the speech analysis engine 114 could perform speech-to-text transcription on the utterance 300 to determine that the audio input data corresponds to the text "hey computer preset one". In other instances, the speech analysis engine 114 can process the utterance 302 to determine that intent behind the utterance is to cause playback from a context associated with a first preset.

At operation 728, the speech analysis engine 114 provides output based on the processing in operation 726. As will be understood, the output is based on the type of processing performed. In some examples, the output includes the speech analysis engine causing execution of a particular command. For instance, the speech analysis engine 114 determines that the user's intent is to access personalized services on the device 100. (e.g., the user said "ahoy computer log me in"), and the process 700 provides an output indicating that a login command should be executed. In some examples, the output is processed audio data (e.g., speech-to-text data and intent data) that is provided to another analysis or processing engine for further processing.

The process of providing audio input to the speech analysis engine 114 for processing can introduce delays. For example, the time the device 100 takes to provide the audio data for processing and wait for the output to be provided can introduce latency in the voice-based user interface. While, in some instances, the performance of the speech analysis engine 114 outweighs drawbacks associated with introduced latency, in some instances activation trigger overloading is relevant to decreasing both latency and resource consumption in utterance-based user interfaces.

Activation Trigger Overloading

Figure 8:
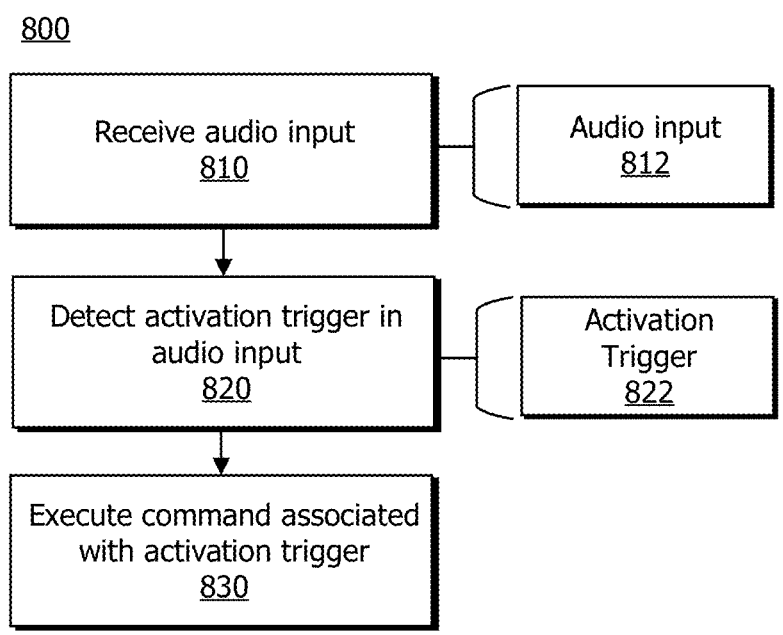
FIG. 8 illustrates an example process for activation trigger overloading usable.

FIG. 8 illustrates an example process 800 for activation trigger overloading usable by a device (e.g., device 100) to provide an improved utterance-based user interface configured to recognize both command-type activation triggers and analysis-type activation triggers. In an example, there is a computer-readable medium having one or more sequences of instructions that, when executed by one or more processors, cause the one or more processors to perform one or more processes or operations described herein, such as the process 800.

The process 800 begins at operation 810, which involves receiving audio input 812. The device is able to receive audio input 812 in a variety of different ways. In many examples, the audio input 812 is received from a microphone. In other examples, the device 100 receives the audio input over a connection to another device (e.g., an external microphone or other audio source).

In operation 820, an activation trigger 822 is detected in the audio input 812. The activation trigger to 822 is detectable in a variety of different ways. In an example, a machine learning framework is configured to receive audio features of the audio input 812 and provide an output based thereon indicating whether the received audio includes the activation trigger 822. In some examples, the activation trigger is detected by providing the audio input 812 to a speech analyzer configured to detect utterances defined in a specific grammar, such as a limited set of words, phrases, or other utterances that act as activation triggers. In the grammar example, the activation trigger is considered detected if an utterance is recognized as having a component (e.g., constituent word or phrase) contained within the grammar.

In some examples, the detection of the activation trigger 822 involves providing the audio input 812 to multiple different components configured to detect activation triggers. These components are able to be arranged in series or in parallel. In an example, each component is a trained machine learning framework configured to detect whether a particular activation trigger is detected within the audio input 812. Each component provides an output regarding whether the component detects a specific activation trigger. The output of the various components is then aggregated and used to determine a course of action to take next, such as executing a particular command.

In an example, operation 820 includes determining whether the audio input 812 includes a speech analysis pattern; and responsive to the audio input including a speech analysis pattern, activating the speech analysis engine for identification of a command. For example, activating the speech analysis engine includes establishing a connection with a remote server having the speech analysis engine. In the example, the operation 820 further includes determining whether the audio input 812 includes a command pattern, and responsive to determining that the audio input includes the command pattern, executing a command associated with the command pattern.

At operation 830, a command associated with the activation trigger 822 is executed. For example, if the output of a first component indicates detection of a first activation trigger, then a first command is executed, and if the output of a second component indicates detection of a second activation trigger, then a second command is executed. The associated command is able to be determined in a variety of different ways. In an example, the associated command is selected from a plurality of commands. In an example, there is a lookup table or other data structure associating particular activation triggers 822 with particular commands. An example of such a structure is described below in connection with FIG. 9.

The command can take a variety of different forms, such as an activation trigger 822 that causes execution of a command that activates a speech processing engine (e.g., an analysis-type activation trigger), and another activation trigger 822 (e.g., a command-type activation trigger) associated with executing a command that activates one or more features of a device. In an example, a media playback appliance (e.g., a smart speaker system or a car head unit) has various activation triggers 822 configured to execute commands associated with controlling playback of media content items, such as playing a media content item, pausing playback, fast forwarding, rewinding, skipping forward, skipping backward, favoriting a media content item, and changing a currently-playing context (e.g., a playlist), among others.

FIG. 9 illustrates an example implementation of the activation trigger data store 116 having an activation trigger data structure 900. The activation trigger data store 116 is configured to store data or data structures that facilitate the selection of a command 904 associated with a particular activation trigger pattern 902. The activation trigger patterns 902 include two primary categories: speech analysis patterns 910 and command patterns 920. As previously described, speech analysis patterns 910 are patterns that cause execution of a command associated with activating a speech processing engine for additional processing, whereas the command patterns 920 are activation triggers associated with particular commands that are executable without substantial additional speech processing. In the illustrated example, the activation trigger data store 116 is configured to store a lookup table data structure 900 that matches activation trigger patterns 902 with respective commands 904. However, the data structure 900 can take other forms, including, but not limited to, databases, decision trees, and machine learning frameworks. In an example, the speech analysis pattern 910 is a first pattern, the command pattern 920 is a second pattern, and the second pattern includes the first pattern.

Figure 10:
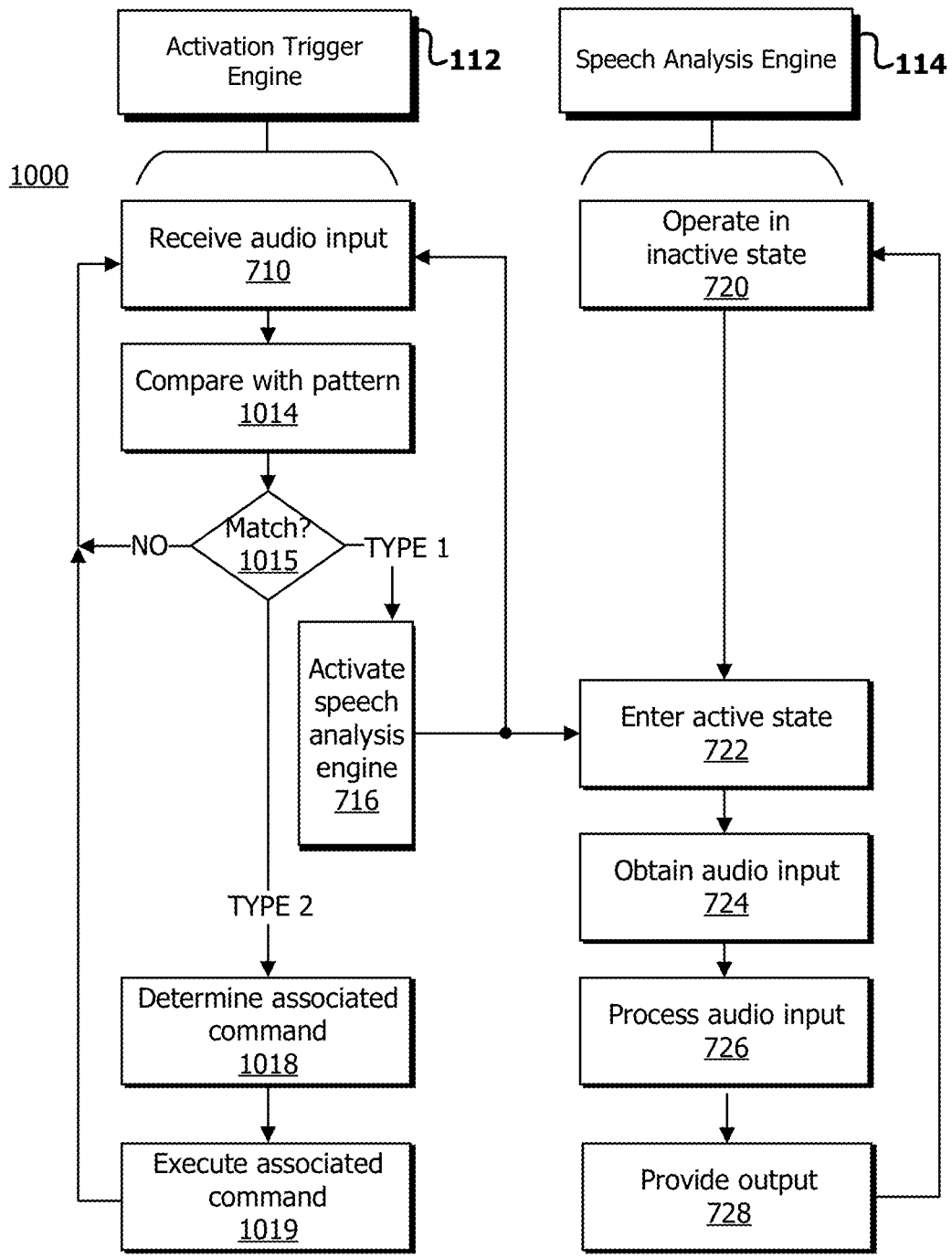
FIG. 10 illustrates an example process for activation trigger overloading.

FIG. 10 illustrates an example process 1000 for activation trigger overloading, whereby a device can process command-type activation triggers in addition to analysis-type activation triggers. In an example, the activation trigger engine 112 selectively activates the speech analysis engine 114 based on an activation trigger of the audio input matching a first pattern; and responsive to the activation trigger matching a second pattern, the activation trigger engine causes execution of a command associated with the second pattern without requiring an output from the speech analysis engine 114.

The process 1000 begins with operation 710, which, as previously discussed, involves receiving audio input.

In operation 1014, the audio input is compared with a pattern. For example, one or more features are extractable from the audio input. The features are then compared to one or more patterns to determine if there is a match. In some examples, the features are provided to a machine learning framework (e.g., a neural network), and the machine learning framework provides an output indicating whether or not the audio input matches a particular pattern.

In operation 1015, the activation trigger engine 112 determines whether the result of the comparison in operation 1014 indicates that the audio input matches a pattern and, if so, whether that pattern is of a first type or a second type.

If the pattern matches neither a first type nor a second type, then the flow returns to operation 710.

If the pattern matches a first type, then the process 1000 determines that the audio input includes an analysis-type activation trigger, and the flow moves to operation 716 in which the activation trigger engine 112 causes the speech analysis engine 114 to activate, and the flow continues as described in FIG. 7.

If the pattern matches a second type, then the process 1000 determines that the audio input includes a command-type activation trigger, and the flow moves to operation 1018.

Operation 1018 involves determining a command associated with the audio input. This operation is able to take a variety of different forms. In one example, the result of the comparison with the pattern in operation 1014 includes an indication of which activation trigger was detected. In such an example, a command associated with the indicated activation trigger is determined (e.g., using a lookup table). In another example, the matching process in operations 1014 and 1015 is limited to determining whether the audio input is associated with a first type, a second type, or neither type. The audio input is then passed through another layer of activation trigger detection to determine an associated command.

At operation 1019, the associated command that was determined at operation 1018 is executed. The flow then moves back to operation 710.

Figure 11:
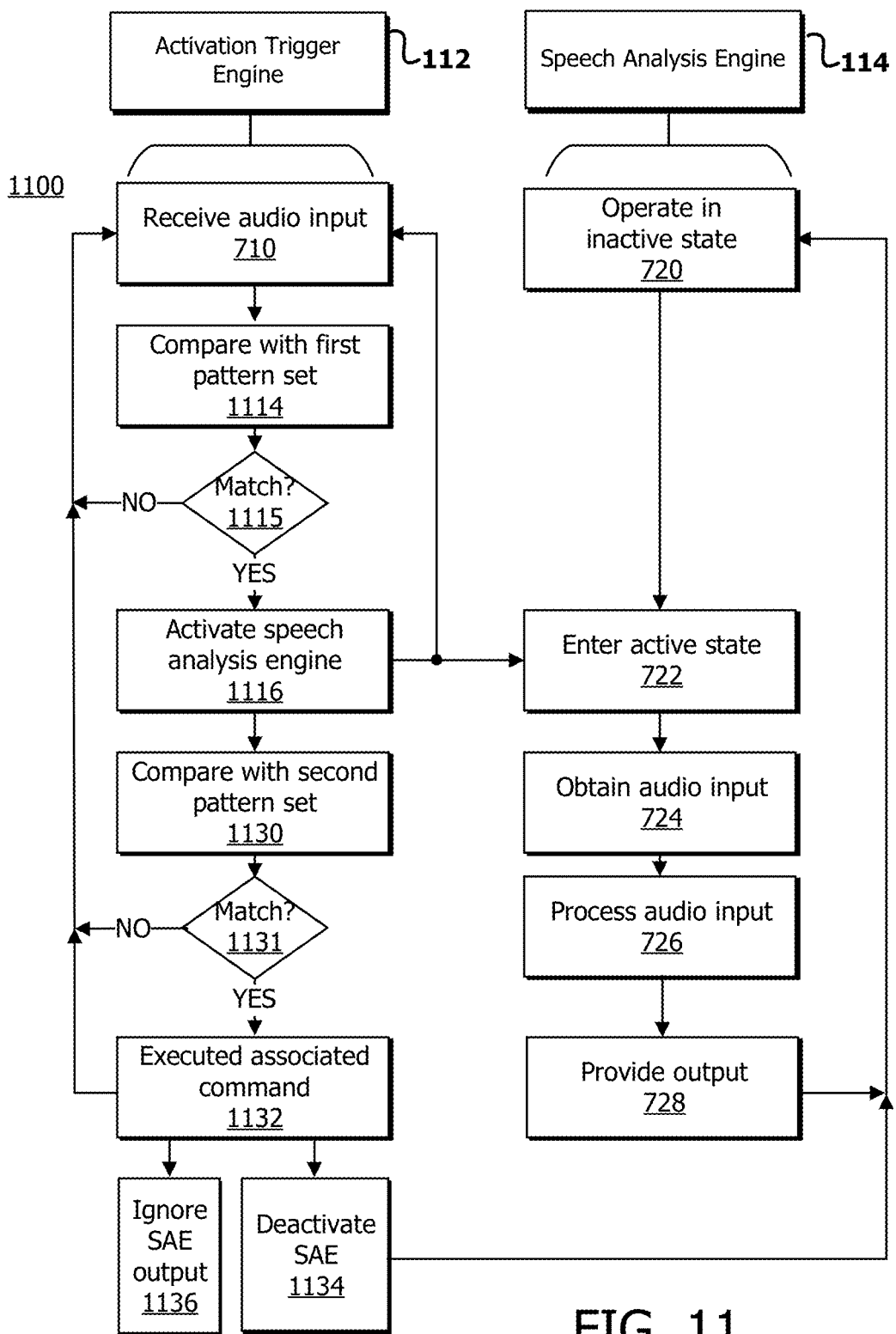
FIG. 11 illustrates an example process for activation trigger overloading.

FIG. 11 illustrates an example process 1100 for activation trigger overloading. At operation 710, audio input is received.

At operation 1114, the audio input is compared with a first pattern set. For example, the first pattern set is a pattern set associated with analysis-type activation triggers. The activation trigger engine 112 is able to perform comparisons of patterns using any of a variety of techniques, including those previously described herein.

At operation 1115, if the comparison in operation 1114 results in a match (e.g., the audio input matches a pattern in the first pattern set), then the flow moves to operation 1116. If the comparison operation 1114 does not result in a match, then the flow moves to operation 710.

In operation 1116, the speech analysis engine 114 is activated and the flow proceeds according to the operations previously described in FIG. 7. However in addition, the flow moves to operation 1130.

In operation 1130, the audio input is compared with a second pattern set. For example, the second pattern set is a command pattern set associated with particular commands.

In operation 1131, if the output of operation 1130 indicates a match between the audio input and the second pattern set, then the flow moves to operation 1132. If not, the flow moves to operation 710.

At operation 1132, a command associated with the matched pattern is determined and executed (e.g., using techniques previously discussed herein).

At this point in the process 1100, the audio input has been sent to both the speech analysis engine 114 for processing and, separately, the activation trigger engine 112 has caused execution of an associated command. In order to conserve processing resources, and to avoid erroneous results, the activation trigger engine 112 takes a remedial action with respect to the processing to be performed or currently being performed by the speech analysis engine 114. For instance, the activation trigger engine 112 ignores the output of the speech analysis engine 114 with respect to the utterance as in operation 1136 or causes the speech analysis engine to halt the processing as in operation 1134, among other options.

In an example, a command pattern includes a speech analysis pattern and the activation trigger engine 112 determines that the audio input 812 includes the command pattern and the speech analysis pattern. In such an example, the activation trigger engine 112 can disregard a response from the speech analysis engine 114 received after executing a command associated with the command pattern. In a further example, the activation trigger engine 112 can deactivate the speech analysis engine 114.

In operation 1134, the activation trigger engine 112 sends a signal to the speech processing engine to deactivate the speech analysis engine 114 with respect to the audio input. If the speech analysis engine 114 is still processing the audio input, then the speech analysis engine 114 performs one or more cleanup steps to wrap up from the processing and to then return to an inactive state in operation 720. In this manner, the duplication of processing by the speech analysis engine 114 is prevented and computer resources are conserved. In some examples, responsive to an activation trigger matching a second pattern, the activation trigger engine deactivates the speech analysis engine.

In operation 1136, the activation trigger engine 112 sets a flag indicating that the output of the speech analysis engine 114 should be ignored with respect to the received audio input. For instance, the received audio input is time stamped, and the flag indicates that output from the speech analysis engine 114 should be ignored where the output is based on audio input having that same timestamp. In an example, the activation trigger engine 112 is configured to cause an output from the speech analysis engine 114 to be disregarded, responsive to an activation trigger matching a second pattern.

In still other examples, the processing continues from the speech analysis engine 114. The output provided from the speech analysis engine 114 in operation 728 is compared with the action taken by the activation trigger engine 112 in operation 1132. If the comparison reveals that the actions to be taken are in agreement, then the speech analysis engine 114 output is ignored. If the comparison reveals that the speech analysis engine 114 came to a different result than the activation trigger engine, then a remedial action is taken. For instance, the result of the comparison reveals that the activation trigger engine incorrectly classified the audio input as containing a particular command pattern.

Device Environment

Figure 12:
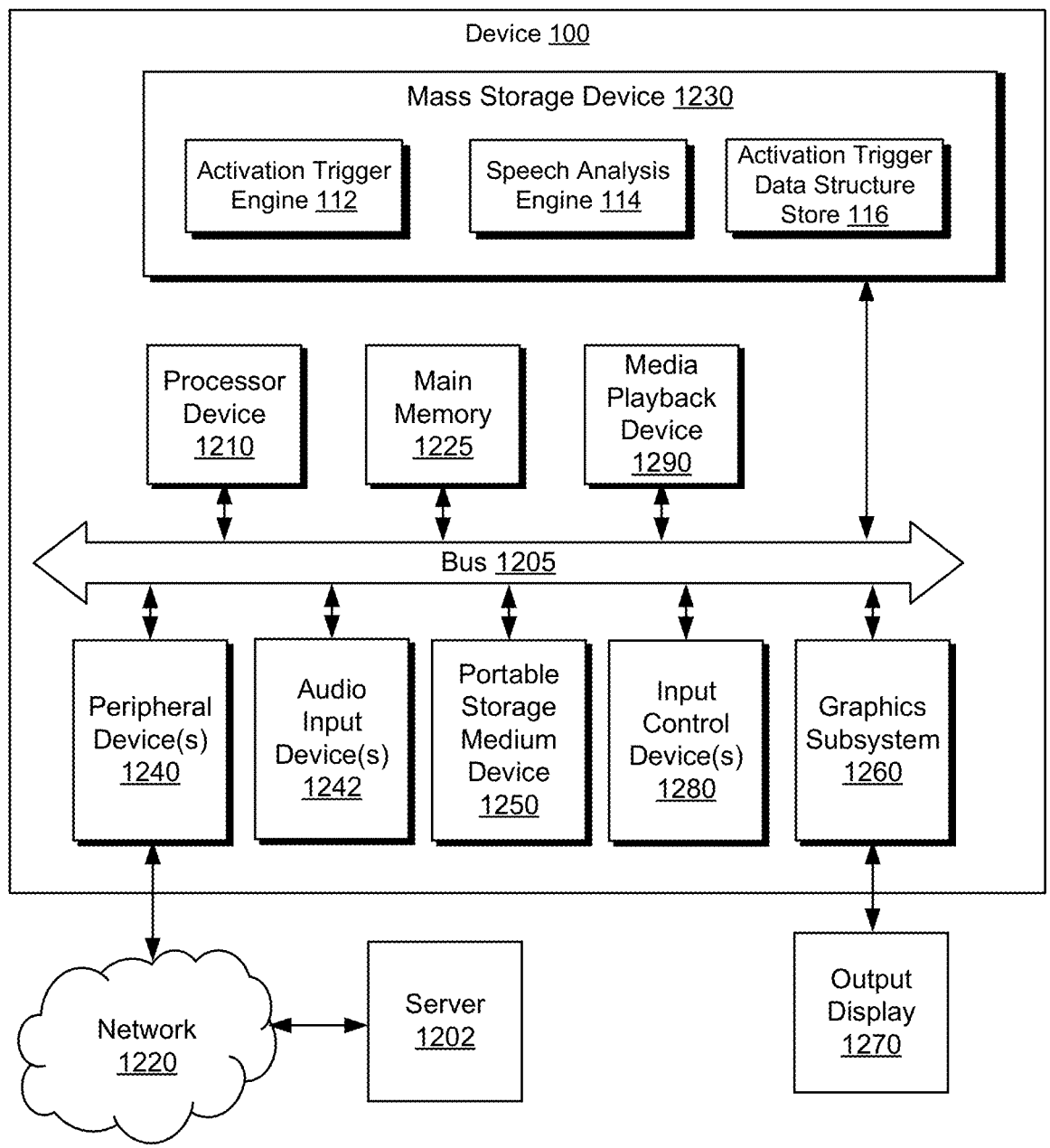
FIG. 12 illustrates an example block diagram showing an exemplary device constructed to realize one or more aspects of the example embodiments described herein.

FIG. 12 is a block diagram showing an exemplary device 100 constructed to realize one or more aspects of the example embodiments described herein.

As discussed above, the device 100 includes a processor device 1210. Also included are a main memory 1225 and an interconnect bus 1205. The processor device 1210 may include, without limitation, a single microprocessor, or may include a plurality of microprocessors for configuring the device 100 as a multi-processor playlist generation system. The main memory 1225 stores, among other things, instructions and/or data for execution by the processor device 1210. The main memory 1225 may include banks of dynamic random access memory (DRAM), as well as cache memory.

The device 100 may further include a mass storage device 1230, peripheral device(s) 1240, audio input device(s) 1242, portable non-transitory storage medium device(s) 1250, input control device(s) 1280, a graphics subsystem 1260, an output display interface 1270, and/or a media playback device 1290. One or more components may be omitted or added. For instance, the device 100 may lack the graphics subsystem 1260 and the output display interface. For explanatory purposes, all components in the device 100 are shown in FIG. 12 as being coupled via the bus 1205. However, the device 100 is not so limited. Elements of the device 100 may be coupled via one or more data transport means. For example, the processor device 1210, and/or the main memory 1225 may be coupled via a local microprocessor bus. The mass storage device 1230, peripheral device(s) 1240, portable storage medium device(s) 1250, and/or graphics subsystem 1260 may be coupled via one or more input/output (I/O) buses. The mass storage device 1230 may be a nonvolatile storage device for storing data and/or instructions for use by the processor device 1210. The mass storage device 1230 may be implemented, for example, with a magnetic disk drive or an optical disk drive. In a software embodiment, the mass storage device 1230 is configured for loading contents of the mass storage device 1230 into the main memory 1225. Memory 1225 may be embodied as one or more of mass storage device 1230, main memory 1225, or portable storage medium device 1250.

Mass storage device 1230 may additionally store one or more of the data structures, or function as one or more of the data stores described above. Mass storage device 1230 may also include software that, when executed, causes the device 100 to perform the features described above. In the illustrated example, the mass storage device 1230 stores the activation trigger engine 112, the speech analysis engine 114, and the activation trigger data store 116.

The portable storage medium device 1250 operates in conjunction with a nonvolatile portable storage medium, such as, for example, a solid state drive (SSD), to input and output data and code to and from the device 100. In some embodiments, the software for storing information may be stored on a portable storage medium, and may be inputted into the device 100 via the portable storage medium device 1250. The peripheral device(s) 1240 may include any type of computer support device, such as, for example, an input/output (I/O) interface configured to add additional functionality to the device 100. For example, the peripheral device(s) 1240 may include a network interface card for interfacing the device 100 with a network 1220. The audio input devices 1242 may be one or more devices configured to receive or obtain audio and provide a representation of the audio (e.g., as an audio clip or file) as output. The audio input device(s) 1242 may include one or more microphones or other devices.

The input control device(s) 1280 provide a portion of an interface for the device 100. The input control device(s) 1280 may include a keypad and/or a cursor control device. The keypad may be configured for inputting alphanumeric characters and/or other key information. The cursor control device may include, for example, a handheld controller or mouse, a rotary input mechanism, a trackball, a stylus, and/or cursor direction keys. In order to display textual and graphical information, the device 100 may include the graphics subsystem 1260 and the output display 1270. The output display 1270 may include a display such as a TFT (Thin Film Transistor), TFD (Thin Film Diode), OLED (Organic Light-Emitting Diode), AMOLED display (active-matrix organic light-emitting diode), and/or liquid crystal display (LCD)-type displays. The displays can also be touchscreen displays, such as capacitive and resistive-type touchscreen displays.

The graphics subsystem 1260 receives textual and graphical information, and processes the information for output to the output display 1270.

Input control devices 1280 can control the operation and various functions of device 100. Input control devices 1280 can include any components, circuitry, or logic operative to drive the functionality of device 100. For example, input control device(s) 1280 can include one or more processors acting under the control of an application.

Each component of the device 100 may represent a broad category of a computer component of a general and/or special purpose computer. Components of the device 100 are not limited to the specific implementations provided herein.

Software embodiments of the examples presented herein may be provided as a computer program product, or software, that may include an article of manufacture on a machine-accessible or machine-readable medium having instructions. The instructions on the non-transitory machine-accessible, machine-readable or computer-readable medium may be used to program a computer system or other electronic device. The machine- or computer-readable medium may include, but is not limited to, magnetic disks, optical disks, magneto-optical disks, or other types of media/machine-readable media suitable for storing or transmitting electronic instructions. The techniques described herein are not limited to any particular software configuration. They may find applicability in any computing or processing environment. In some embodiments, there are one or more processors configured to operate as a particular program product or engine. In some embodiments, one or more processors are coupled to a memory storing instructions that, when executed, cause the one or more processors to operate in a particular manner. In some embodiments, the one or more processors can include two or more sets of processors operating on different devices.

The terms "computer-readable", "machine-accessible medium" or "machine-readable medium" used herein shall include any medium that is capable of storing, encoding, or transmitting a sequence of instructions for execution by the machine, and which causes the machine to perform any one of the methods described herein. Further, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein that can be used to control, or cause, a computer to perform any of the procedures of the example embodiments of the invention. The storage medium may include, without limitation, an optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include, without limitation, device drivers, operating systems, and user applications. Ultimately, such computer-readable media further include software for performing example aspects of the invention, as described above.

Included in the programming and/or software of the system are software modules for implementing the procedures described above.

The device 100 may be connected over the network 1220 to one or more servers 1202 or other remote devices. The one or more servers 1202 can include one or more components described above in relation to device 100, including a mass storage device and a processor device.

Various operations and processes described herein can be performed by the cooperation of two or more devices, systems, processes, or combinations thereof.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

The invention claimed is:

1. A system, comprising:
one or more processors configured to operate as:
 a speech analysis engine; and
 an activation trigger engine configured to:
  detect an activation trigger within an audio input;
  responsive to the activation trigger matching a first an analysis-type activation trigger pattern, activating the speech analysis engine; and
  responsive to the activation trigger matching a command-type activation trigger pattern, cause execution of a command associated with the command-type activation trigger pattern without activating the speech analysis engine,
 wherein the analysis-type activation trigger pattern includes an analysis-type activation trigger set of two or more syllables; and
 wherein the command-type activation trigger pattern includes a command-type activation trigger set formed from the union of a proper subset of the command-type activation trigger set and a command component set of one or more syllables.

2. The system of claim 1, wherein the speech analysis engine is configured to perform speech-to-text conversion and the activation trigger engine is configured to detect the activation trigger within the audio input without using speech-to-text conversion.

3. The system of claim 1, wherein the one or more processors include a first set of one or more processors configured to operate as the speech analysis engine and a second set of one or more processors configured to operate as the activation trigger engine; and
 wherein the system further comprises:
  a first device having the first set of one or more processors configured to operate as the speech analysis engine; and a second device remote from the first device and having the second set of one or more processors configured to operate as the activation trigger engine.

4. The system of claim 1, wherein the speech analysis engine is configured to perform speech recognition on audio input.

5. The system of claim 1,
wherein the speech analysis engine is configured to perform natural language processing on audio input; and
wherein the activation trigger engine is not configured to perform natural language processing on audio input.

6. The system of claim 1,
wherein the speech analysis engine is configured to produce an intent based on natural language processing and cause performance of an associated action; and
wherein the activation trigger engine is not configured to produce an intent based on natural language processing.

7. The system of claim 1, wherein selectively activating the speech analysis engine includes piping output of a recording device or process to the speech analysis engine.

8. The system of claim 1, wherein the activation trigger engine is configured to determine whether the activation trigger matches the analysis-type activation trigger pattern of the command-type activation trigger pattern based on features extracted from the audio input.

9. The system of claim 8, wherein the features include cepstral coefficient features.

10. A non-transitory computer readable medium storing instructions that, when executed by one or more processors, cause the one or more processors to:
operate a speech analysis engine configured to perform speech-to-text conversion;
operate an activation trigger engine configured to, without using speech-to-text conversion:
detect an activation trigger within an audio input;
responsive to the activation trigger matching an analysis-type activation trigger pattern, activate the speech analysis engine; and
responsive to the activation trigger matching a command-type activation trigger pattern, cause execution of a command associated with the command-type activation trigger pattern without activating the speech analysis engine,
wherein the analysis-type activation trigger pattern includes an analysis-type activation trigger set of two or more syllables; and
wherein the command-type activation trigger pattern includes a command-type activation trigger set formed from the union of a proper subset of the command-type activation trigger set and a command component set of one or more syllables.

11. A system, comprising:
a first device having a first set of one or more processors configured to operate as a speech analysis engine;
a second device having a second set of one or more processors configured to operate as an activation trigger engine, wherein the activation trigger engine is configured to, without using speech-to-text conversion:
detect an activation trigger within an audio input;
responsive to the activation trigger matching an analysis-type activation trigger pattern, remotely activate the speech analysis engine of the first device; and
responsive to the activation trigger matching a command-type activation trigger pattern, cause execution of a command associated with the command-type activation trigger pattern without activating the speech analysis engine,
wherein the analysis-type activation trigger pattern includes an analysis-type activation trigger set of two or more words; and
wherein the command-type activation trigger pattern includes a command-type activation trigger set formed from the union of a proper subset of the command-type activation trigger set and a command component set of one or more words.

12. The system of claim 11, wherein the speech analysis engine is configured to perform speech-to-text conversion.

* * * * *